United States Patent
Kumar et al.

(10) Patent No.: US 8,549,614 B2
(45) Date of Patent: Oct. 1, 2013

(54) ESTABLISHING INTERNET PROTOCOL SECURITY SESSIONS USING THE EXTENSIBLE MESSAGING AND PRESENCE PROTOCOL

(75) Inventors: Rajesh Kumar, Palo Alto, CA (US); Michel Khouderchah, Cupertino, CA (US); Baseer Khan, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 889 days.

(21) Appl. No.: 12/631,348

(22) Filed: Dec. 4, 2009

(65) Prior Publication Data

US 2011/0138458 A1    Jun. 9, 2011

(51) Int. Cl.
   *G06F 21/00*    (2006.01)
(52) U.S. Cl.
   USPC ............................................. 726/14; 726/26
(58) Field of Classification Search
   USPC .............. 726/15–19; 709/206, 227; 455/420
   See application file for complete search history.

(56) References Cited

U.S. PATENT DOCUMENTS

| | | | | |
|---|---|---|---|---|
| 7,539,858 B2 * | 5/2009 | Karasawa et al. | ............. | 713/153 |
| 2007/0293212 A1 * | 12/2007 | Quon et al. | ................... | 455/420 |

OTHER PUBLICATIONS

Ludwig et al. "XEP-0166:Jingle" Mar. 9, 2009. Version 0.35.*
P. Saint-Andre, Ed., "Extensible Messaging and Presence Protocol (XMPP): Core", Jabber Software Foundation, Network Working Group, Request for Comments: 3920, Oct. 2004.
S. Kent, IP Encapsulating Security Payload (ESP) BBN Technologies, Network Working Group, Request for Comments: 4303, Dec. 2005.
C. Kaufman, Ed., "Internet Key Exchange (IKEv2) Protocol", Microsoft, Network Working Group, Request for Comments: 4306, Dec. 2005.
D. Black, "Using Authenticated Encryption Algorithms with the Encrypted Payload of the Internet Key Exchange version 2 (IKEv2) Protocol", EMC, Network Working Group, Request for Comments: 5282, Aug. 2008.
Ludwig et al., "XEP-0166: Jingle", XMPP Standards Foundation, Dec. 23, 2009.

* cited by examiner

*Primary Examiner* — Philip Chea
*Assistant Examiner* — Kendall Dolly
(74) *Attorney, Agent, or Firm* — Edell, Shapiro & Finnan, LLC

(57) ABSTRACT

Techniques are provided for sending from a client in a first network device a session initiate message over a first secure network connection that is configured to initiate a communications session with a client in a second network device. The session initiate message is configured to supply connection information for the second network device to establish a second secure network connection with the first network device. A session accept message is received from the client in the second network device over the first secure network connection that is configured to accept the communications session with the client in the first network device. The session accept message is configured to supply connection information for the first network device to establish the second secure network connection with the second network device. The second secure network connection is established between the first network device and the second network device using the connection information.

18 Claims, 7 Drawing Sheets

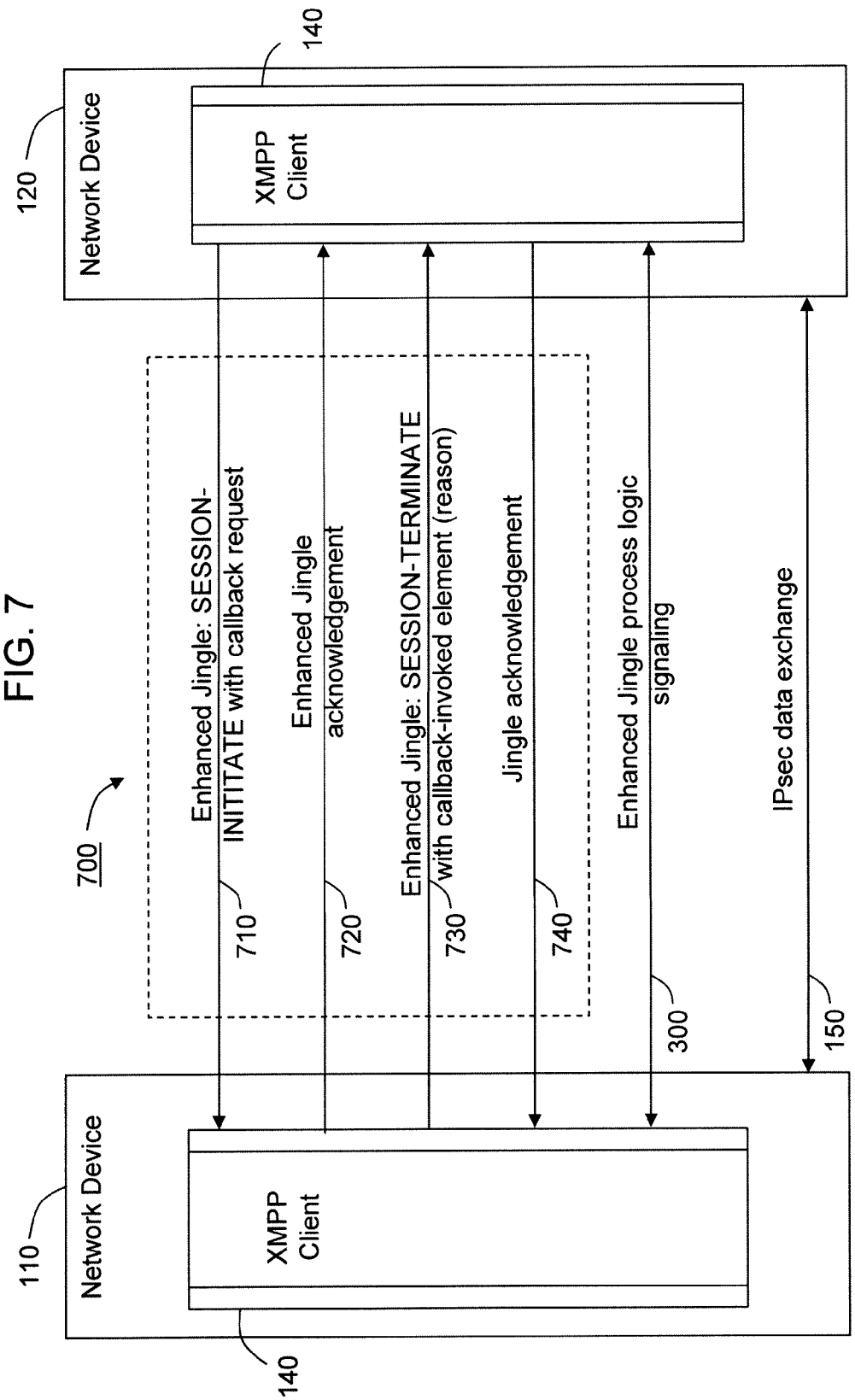

ESTABLISHING INTERNET PROTOCOL SECURITY SESSIONS USING THE EXTENSIBLE MESSAGING AND PRESENCE PROTOCOL

TECHNICAL FIELD

The present disclosure relates to secure Internet Protocol (IP) communications and more particularly to configuring two endpoints for Internet Protocol Security (IPsec) sessions using Extensible Messaging and Presence Protocol signaling.

BACKGROUND

IPsec is a protocol suite for securing IP communications by encrypting IP packets of a data stream. IPsec can use a tunnel mode or a transport mode. Transport mode is used for host-to-host communications and only the payload is encapsulated with the IP header left unchanged. In the tunnel mode the entire IP packet is encrypted and a new header is provided. Tunnel mode is used to establish virtual private networks (VPNs) for secure network-to-network, host-to-host, host-to-network, etc. communications between remote sites. IPsec uses the Internet Key Exchange (IKE/IKEv2) protocol to set up a security association by handling negotiation of protocols and algorithms used to generate encryption and authentication keys for IPsec communications. IPsec uses the Encapsulating Security Payload (ESP) protocol to provide authentication and confidentiality for the IP packets. Thus, IPsec can be used to secure upper layer communications, e.g., user datagram protocol (UDP) over IPsec, or Transport Control Protocol (TCP) over IPsec, and application-to-application communications like Java Message Service.

The Extensible Messaging and Presence Protocol (XMPP), also known as Jabber, is the current Internet Engineering Task Force (IETF) standard for instant messaging and presence. In addition to server-mediated instant messaging, XMPP has been augmented with a signaling mechanism (called "Jingle") to establish unmediated peer-to-peer sessions, such as voice or video sessions. Such peer-to-peer sessions are used to supplement the normal course of instant messaging, e.g., by carrying on a voice conversation in parallel with the text session. The connection that is already established by virtue of XMPP presence can be exploited for peer-to-peer session establishment.

BRIEF DESCRIPTION OF THE DRAWINGS

FIG. 7 is a ladder diagram showing an example of two network devices from FIG. 1 or 4 establishing an IPsec session using Enhanced XMPP Jingle process logic in which a network device initiates a callback request to another network device.

DESCRIPTION OF EXAMPLE EMBODIMENTS

Overview

Techniques are provided for sending from a client in a first network device a session initiate message over a first secure network connection that is configured to initiate a communications session with a client in a second network device. The session initiate message is configured to supply connection information for the second network device to establish a second secure network connection with the first network device. A session accept message is received from the client in the second network device over the first secure network connection that is configured to accept the communications session with the client in the first network device. The session accept message is configured to supply connection information for the first network device to establish the second secure network connection with the second network device. The second secure network connection is established between the first network device and the second network device using the connection information.

At present, there is no mechanism for leveraging XMPP to establish secure, peer-to-peer IPsec/UDP ESP sessions, whether in the tunneled or transport mode. One device may wish to establish a peer-to-peer IPsec/UDP session with another device for the purpose of enhanced security, e.g., bypassing the XMPP server, or to achieve greater throughput, i.e., not being subject to XMPP-server mediation. To establish and IPsec/UDP session the communicators (devices) would need to resort to a separate and unrelated signaling mechanism such as IKEv2 for establishing a security association between each other, and for exchanging encryption and integrity check keys. This additional IKEv2-based signaling mechanism consumes resources unnecessarily since it does not leverage existing, encrypted XMPP channels between the communicators. The resources in question are processor capacity, memory, and network bandwidth. By creating a new extension to XMPP Jingle signaling, hereinafter referred to as Enhanced XMPP Jingle signaling, the existing encrypted XMPP channels can be leveraged to establish a peer-to-peer IPsec/UDP session. Traditional Jingle signaling is an extension of XMPP for implementing peer-to-peer session control for multimedia interaction such as voice-over-IP or video conferencing. The techniques described herein provide a further extension or modification of XMPP based on Jingle signaling. Note that the problem of inefficient resource utilization is relevant only if the XMPP channel is already encrypted, i.e., unencrypted XMPP channels will still have to use an IKEv2 type mechanism.

Example Embodiments

Figure 1:
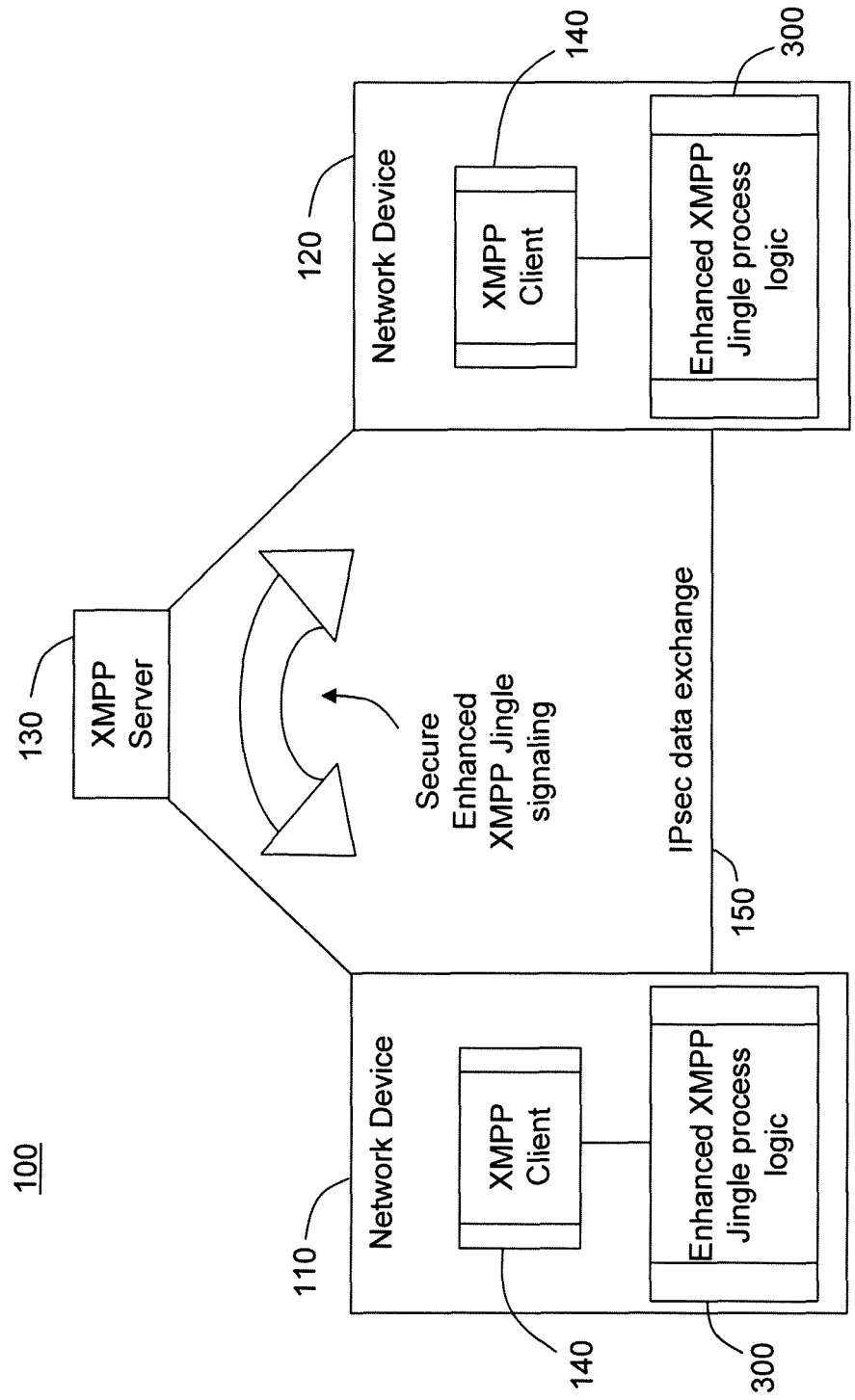
FIG. 1 is a block diagram showing an example of an intranet network in which two network devices communicate IPsec provisioning information with each other.

Referring first to FIG. 1, a system 100 is shown. The system 100 comprises two (first and second) network devices or endpoints 110 and 120, and an XMPP server device 130. Each network device has an XMPP client 140 that is configured with Enhanced XMPP Jingle process logic 300. For simplicity, each network device 110 and 120 is considered to be in a VPN using a common IP address space and network devices 110 and 120 communicate with each other over the VPN. The network devices 110 and 120 are also considered to be in XMPP presence, i.e., the two devices are alive and aware of each other via secure XMPP signaling mediated by XMPP server 130. Secure signaling may be achieved over XMPP using a secure transport mechanism, e.g., encapsulating XMPP using the Transport Layer Security (TLS) protocol. The Enhanced XMPP Jingle process logic 300 provides a key exchange mechanism to configure the devices for IPsec data exchange 150. The Enhanced XMPP Jingle process logic 300 will be described in greater detail in connection with FIG. 3.

Figure 2:
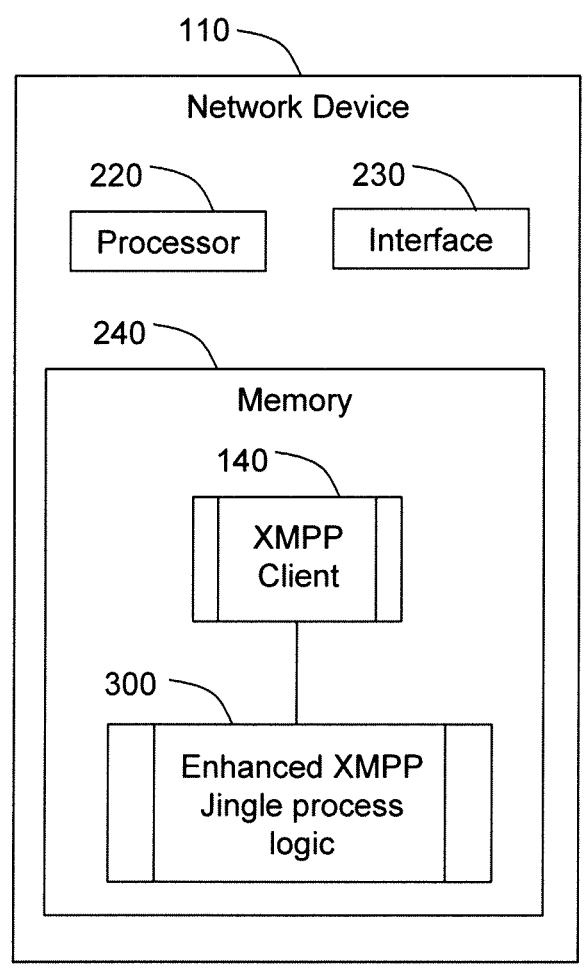
FIG. 2 is a block diagram of a network device configured with Enhanced XMPP Jingle process logic.

Referring to FIG. 2, a network device, e.g., network device 110, is shown. The network device 110 comprises a data processing device 220, an interface unit 230, and a memory 240. Resident in the memory 240 is software configured to execute XMPP client 140 and Enhanced XMPP Jingle process logic 300. The data processing device 220 may be a microprocessor, a microcontroller, systems on a chip (SOCs), or other fixed or programmable logic. The memory 240 may be any form of random access memory (RAM) or other data storage block that stores data used for the techniques described herein. The memory 240 may be separate or part of the processor 220. Instructions for performing the process logic 300 may be stored in the memory 240 for execution by the processor 220 such that when executed by the processor, causes the processor to perform the functions describe herein in connection with FIG. 3. The interface unit 230 enables communication between the network device 110, network device 120, the server device 130, and ultimately to other network elements including clients, agents, and servers in the system 100. It should be understood that any of the devices in system 100 may be configured with a similar hardware or software configuration as network device 110.

The functions of the processor 220 may be implemented by a processor readable tangible medium encoded with instructions or by logic encoded in one or more tangible media (e.g., embedded logic such as an application specific integrated circuit (ASIC), digital signal processor (DSP) instructions, software that is executed by a processor, etc.), wherein the memory 240 stores data used for the computations or functions described herein (and/or to store software or processor instructions that are executed to carry out the computations or functions described herein). Thus, functions of the process logic 300 may be implemented with fixed logic or programmable logic (e.g., software or computer instructions executed by a processor or field programmable gate array (FPGA)).

Figure 3:
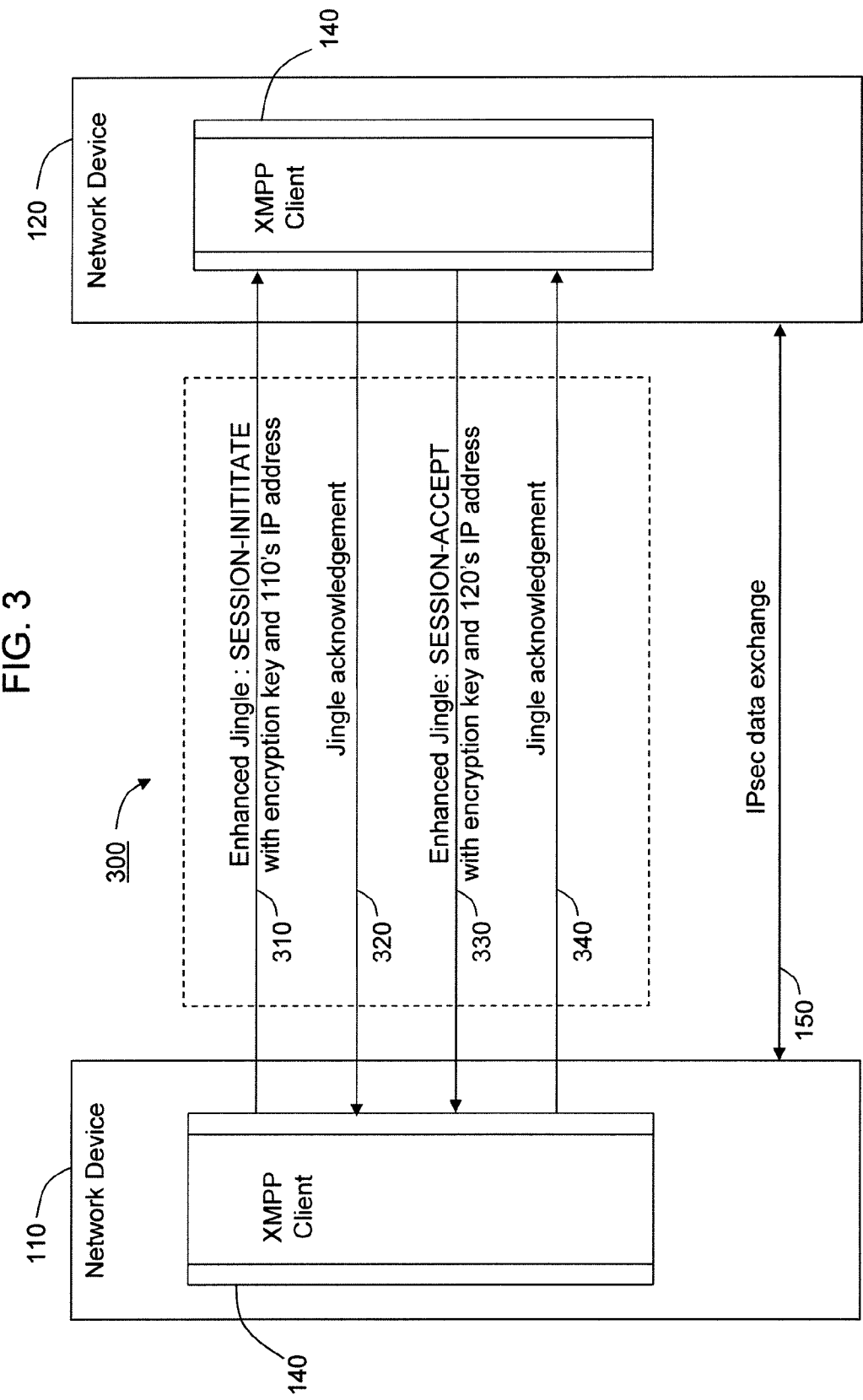
FIG. 3 is a ladder diagram showing an example of two network devices establishing an IPsec session using Enhanced XMPP Jingle process logic.

Referring to FIG. 3, Enhanced XMPP Jingle process logic 300 is described via an exchange of messages between the network device 110 and the network device 120, and mediated by the XMPP server 130. The network device 110 is in secure XMPP presence with network device 120, and desires to establish IPsec communication with network device 120. In other words, as a precondition to the process of FIG. 3, there is TLS-server mediated connectivity between the network devices 110 and 120. Briefly, the process logic 300 starts with sending a modified or "Enhanced" Jingle SESSION-INITIATE message, i.e., the Enhanced Jingle SESSION-INITIATE message conforms to a modified Jingle extension of XMPP. The Enhanced Jingle SESSION-INITIATE message is followed by receipt of an Enhanced Jingle SESSION-ACCEPT message along with Jingle acknowledgements included for handshaking. At 310, network device 110 is a session initiator and sends an Enhanced Jingle SESSION-INITIATE message to offer a session to a responder, e.g., network device 120. The Enhanced Jingle SESSION-INITIATE message specifies a session identifier (sid), session keys, and one or more IP addresses. An example of Jingle SESSION-INITIATE message is shown in Listing 1 below. Note that prior to sending the Enhanced Jingle SESSION-INITIATE message the network device 110 generates the session keys required for the message and may perform Simple Authentication and Security Layer (SASL) authentication with the XMPP server.

Listing 1.

```
<iq from='device1@cluster1.cisco.com/out-of-band'
    id='jingle1'
    to='device2@cluster1.cisco.com/out-of-band'
    type='set'>
  <jingle xmlns='urn:xmpp:jingle:1'
          action='session-initiate'
          initiator='device1@cluster1.cisco.com/out-of-band'
          sid='a73sjjvkla37jfea'>
    <content creator='initiator' name='ipv4sec-udp-v1'>
      <description
        xmlns='http://collaboratory.cisco.com/confluence/x/4oMKAQ'
            payloadfmt='ipv4-tunnel'/>
      <transport
        xmlns='http://collaboratory.cisco.com/confluence/x/4oMKAQ'
            stunpwd='7838848CDAC68F215934E30476CBE623571DBB63'
            spi='FF7B4266'
            encryption='aes-cbc-128'
            integritycheck='hmac-sha1-96'
            encrkey='81B8D0C63F714C2642E88CCC2426EE53'
            integritykey='F5908F0B5F94E964C080B4114314EDD843CF9DB9'
            fngrprnt='7A740F41CDB0975C2A364B7103BF1D8851A69E0E'>
        <candidate candidateid=1
            associateid=2
            addrtype='ipv4-public'
            ip='171.70.192.201'
            port='4500'/>
```

-continued

Listing 1.

```
            <candidate candidateid=2
                associateid=1
                addrtype='ipv4-private'
                ip='192.168.94.32'
                port='4500'/>
        </transport>
      </content>
    </jingle>
</iq>
```

The SESSION-INITIATE message or stanza is in Extensible Markup Language (XML) format. The information/query <iq> start tag and attributes conform to IETF Request for Comments (RFC) 3920. The <jingle>, <content>, <description>, and <transport> start tags conform to the XMPP Extension Protocol (XEP)-0166 (Jingle) format. However, the defined XML namespaces (xmlns) is a demarcation point for the techniques described herein and where the enhanced Jingle extension differs from the Jingle extension (XEP-0166, Jun. 10, 2009). The <content> element has <description> and <transport> elements, but may have a <call-back request> element instead. Call-back requests will be described hereinafter in connection with FIG. 7.

In the XML code sample of Listing 1, the 'id' attribute is set to 'jingle1' for consistency with the examples in XEP-0166 and XEP-0167. There is no particular significance to this choice. The sole purpose of the 'id' attribute is to correlate <iq/> requests with responses. Any other string such as '123' or 'abc' could have been used instead. The XMPP Jabber IDs (JIDs) in the 'from', 'to' and 'initiator' attributes in this XML code sample are based on the node@domain/resource format defined in RFC 3920. The 'from' and 'initiator' JIDs in this XML code segment are identical.

The <description/> element shown in Listing 1 includes one payload format (payloadfmt). The responder, e.g., network device 120, rejects the offer if it does not support this payload format. The value of the payload format in this example is 'ipv4-tunnel'. The <transport/> element includes two <candidate/> sub-elements, as well as a set of common attributes that are external to the candidate sub-elements. The common transport attributes are the STUN password (stunpwd), security parameters index (spi), encryption method (encryption), integrity check method (integritycheck), encryption algorithm key (encrkey), the integrity check algorithm key (integritykey) and fingerprint (fngrprnt). The interaction of STUN with the process logic 300 will be described in connection with FIG. 5.

The security parameters index (spi) is unique for each direction. The spi value in the SESSION-INITIATE message is intended for the responder to insert into IPsec packets directed towards the initiator. The offered encryption method and integrity check method are bidirectional attributes. These are either accepted by the responder or the responder terminates the session. In this example, the encryption method is "aes-cbc-128" which indicates Advanced Encryption Standard (AES) with cipher-block chaining (CBC), 128 bit key. The AES encryption method may include cipher feedback or AES counter mode. AES may use key sizes of 128, 192, or 256 bits. Triple Data Encryption Standard (3DES) is an alternate encryption algorithm that uses a 192 bit key. The integrity check algorithm offered is hmac-sha1-96 which stands for hash-base message authentication code (HMAC)-secure hash algorithm (SHA) 1, with the digest or hash value truncated to 96 bits. Other integrity check algorithms include variations of SHA, AES-CBC-Message Authentication Code (MAC), and HMAC-Message Digest (MD).

Although it is possible for different key values to be used for each direction, the responder may echo the encryption algorithm key and the integrity check algorithm key if it accepts the offer. The responder may choose to ignore the fingerprint computed over the <jingle/> element or to verify it by contacting a certificate authority, e.g., for an X.509 certificate. Based on this validation, the responder will either accept or reject the offer. Rejected offers will be described in connection with FIG. 6.

In this example the session initiator, network device 110, offers two transport candidates, each of which is enclosed within a <candidate/> sub-element. A <candidate/> sub-element is identified by a unique identifier (candidateid). One of these candidates will be accepted by the session responder. The selected 'candidateid' will be echoed in remote candidate identifier (remcandidateid) attribute in the Enhanced Jingle SESSION-ACCEPT message. The session responder should accept only one offered transport candidate. Since the session initiator is not indicating the selection of a remote transport candidate, the 'remcandidateid' attribute is absent as an attribute of the <transport/> element in Listing 1.

The <candidate/> element includes the following attributes: IP address type (addrtype), IP address (ip) and UDP port (port). The IP address type indicates whether the IP address in the candidate element is a public IPv4, private IPv4, or IPv6 address. The IP address and UDP port are unique for each direction. The IP address type in the transport candidate element constructed and advertised by the session responder in the Enhanced Jingle SESSION-ACCEPT message should be identical to the IP address type in the initiator-offered transport candidate that is accepted by the session responder.

One of the transport candidates offered by the session initiator contains a public IP address, while the other contains a private, NAT-translated IP address. The fact that these addresses are bound to each other (one is the translated version of the other) is indicated via the associateid attribute, i.e., one candidate's candidateid is the other candidate's associateid and vice versa.

Referring again to FIG. 3, at 320, the Enhanced Jingle SESSION-INITIATE message is acknowledged by network device 120 using a standard Jingle acknowledgment. At 330, if the offer is accepted, network device 120 sends a modified or "Enhanced" Jingle SESSION-ACCEPT message, i.e., the Enhanced Jingle SESSION-ACCEPT message conforms to a modified Jingle extension of XMPP. An example Enhanced Jingle SESSION-ACCEPT message is shown in Listing 2 below.

Listing 2.

```
<iq from='device2@cluster1.cisco.com/out-of-band'
    id='accept1'
    to='device1@cluster1.cisco.com/out-of-band'
    type='set'>
  <jingle xmlns='urn:xmpp:jingle:1'
          action='session-accept'
          initiator='device1@cluster1.cisco.com/out-of-band'
          responder='device2@cluster1.cisco.com/out-of-band'
          sid='a73sjjvkla37jfea'>
    <content creator='initiator' name='ipv4sec-udp-v1'>
      <description
          xmlns='http://collaboratory.cisco.com/confluence/x/4oMKAQ'
                payloadfmt='ipv4-tunnel'/>
      <transport
          xmlns='http://collaboratory.cisco.com/confluence/x/4oMKAQ'
                stunpwd='7838848CDAC68F215934E30476CBE623571DBB63'
                spi='F7DF0B74'
                encryption='aes-cbc-128'
                integritycheck='hmac-sha1-96'
                encrkey='81B8D0C63F714C2642E88CCC2426EE53'
                integritykey='F5908F0B5F94E964C080B4114314EDD843CF9DB9'
                fngrprnt='E9D8D2D420D097915017E4AC059A43795C659215'
                remcandidateid=1>
        <candidate candidateid=500
                addrtype='ipv4-public'
                ip='24.6.154.142'
                port='59764'/>
      </transport>
    </content>
  </jingle>
</iq>
```

In the XML code sample of Listing 2, the 'id' attribute is set to 'accept1' for consistency with the examples in XEP-0166 and XEP-0167. There is no particular significance to this choice. The sole purpose of the 'id' attribute is to correlate <iq/> requests with responses. Any other string such as '456' or 'xyz' could have been used instead. The optional resource identifier in the 'from', 'to', 'initiator' and 'responder' JIDs above points to an XMPP client component or resource responsible for the setup of out of band sessions such as IPsec/UDP pipes. The resource identifier is included for illustrative purposes only. Depending on the implementation, it may be omitted. The 'to' and 'initiator' JIDs in this XML code segment are identical, as are the 'from' and 'responder' JIDs. The value of the session identifier (sid) is the same as in the SESSION-INITIATE message.

The values of the 'creator' and 'name' attributes in the <content/> start tag are the same as in the SESSION-INITIATE message. The 'payloadfmt' attribute of the <description/> sub-element echoes the value ('ipv4-tunnel') in the SESSION-INITIATE message. The only other option would have been to reject the offer via a SESSION-TERMINATE message because of an unsupported payload format. The SESSION-TERMINATE message is described hereinafter in connection with FIG. 7. The values of the following <transport/> element attributes are echoed from the SESSION-INITIATE message into the SESSION-ACCEPT message: STUN password (stunpwd), encryption method (encryption), integrity check method (integritycheck), encryption key (encrkey) and the integrity check key (integritykey). The values of these security attributes could have been different from those in the offer, i.e., bi-directional communication can occur with different encryption methods and keys for each direction. However, in this example, the initiator and responder are known to each other and the initiator is assigned responsibility for generating these security attributes. Consequently, the only option other than echoing the values of the encryption and integrity check attributes for this example would have been to reject the offer via a SESSION-TERMINATE message. The security parameters index (spi) is generated anew by the responder. The spi is communicated via the SESSION-ACCEPT message for the initiator to insert into IPsec packets directed towards the responder.

Network device 120 uses its own X.509 certificate to generate the value of the optional 'fngrprnt' attribute in the SESSION-ACCEPT message. This is not an echo of the 'fngrprnt' value in the SESSION-INITIATE message. The initiator may make a determination regarding any <jingle/> fingerprint it might have received from the responder. The initiator may choose to ignore the fingerprint. Alternately, the initiator may choose to contact a Certificate Authority to validate the fingerprint using the JID associated with the 'from' attribute as the reference for obtaining the certificate. Based on configurable policy, the initiator might later issue a SESSION-TERMINATE message or go silent if fingerprint validation is unsuccessful.

The 'remcandidateid' field is set to 1 indicating that the session responder has accepted the transport candidate with an identifier (candidateid) of 1. This is the transport candidate with a public IP address as indicated by the address type (addrtype) in the SESSION-INITIATE message. The session responder constructs and advertises exactly one transport candidate (<candidate/> sub-element) with the same address type. In the XML code sample in Listing 2, this sub-element has a candidate id (candidateid) of 500 and is associated with the responder's public IP address and port number. The IP address (ip) and port number (port) are set to the address and port at which the responder is prepared to receive IPsec/UDP packets from the initiator. The associate id attribute (associated) is not meaningful in this case and is omitted. At 340, the Enhanced Jingle SESSION-ACCEPT message acknowledged by network device 110. Now that the network devices 110 and 120 have each others IP address, port number, and an encryption key and encryption method, they can participate in IPsec session shown at 150.

Figure 4:
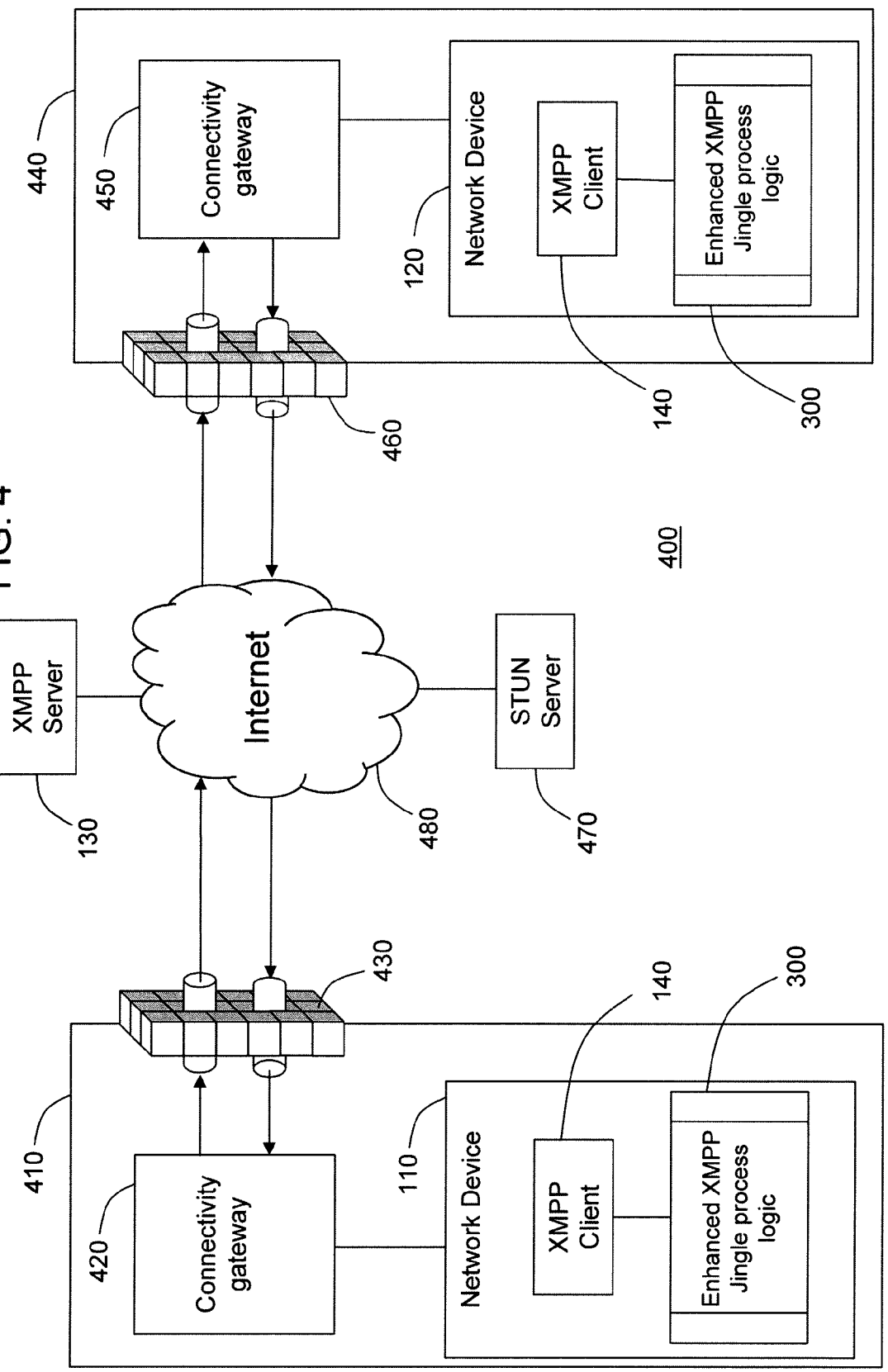
FIG. 4 is a block diagram showing an example of a network in which two network devices communicate IPsec provisioning information with each other through firewalls and the Internet.

Referring now to FIG. 4, a system 400 is shown. System 400 comprises remote sites 410 and 440 coupled via the Internet 480. Remote site 410 includes the network device 110 from FIG. 1, a connectivity gateway or router 420, and a firewall 430. Remote site 440 includes the network device 120 from FIG. 1, a connectivity gateway or router 450, and a firewall 460. System 400 also includes the XMPP server device 130 from FIG. 1 and a STUN server 470. Unlike system 100, network devices 110 and 120 are in private IP address spaces (intranets) of remote sites 410 and 440, respectively. The connectivity gateways 420 and 450 may be part of a perimeter network or demilitarized zone (DMZ) to provide addition network security for the internal networks in remote sites 410 and 440.

The connectivity gateways 420 and 450 employ network address translators (NATs) or network address port translators (NA(P)Ts) to translate public IP addresses (and ports) to private IP addresses (and ports), and vice versa, to enable network devices 110 and 120 to communicate outside of their respective remote sites. In order to traverse the firewalls 430 and 460 the parties can use standard ports or agree ahead of time on how access will be granted. The STUN protocol is used to bind the private IP address of the network devices to the public IP address used by the connectivity gateways. STUN requires assistance from a third-party network server (STUN server 470) located on the opposing (public) side of the NAT, usually the public Internet, e.g., Internet 480. The STUN server 470 may also be part of an XMPP client like XMPP client 140 and reside in one of the remote sites 410 and 440, or reside in a DMZ. The XMPP server 130 may also reside in one of the remote sites 410 and 440, and more than one or a federation of XMPP servers may exist in system 400.

Figure 5:
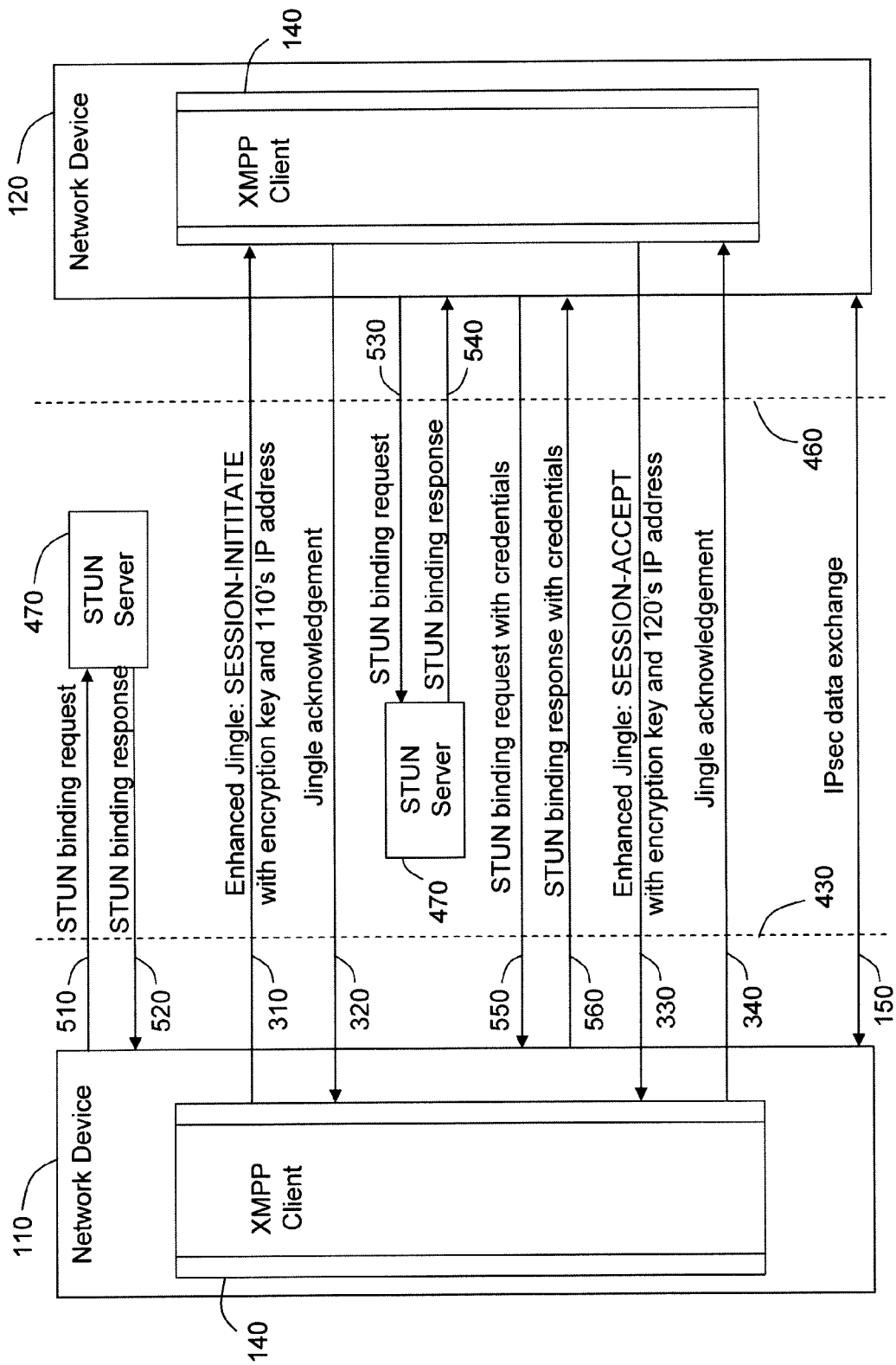
FIG. 5 is a ladder diagram showing an example of two network devices from FIG. 4 establishing an IPsec session using Enhanced XMPP Jingle process logic and Simple Traversal Utilities for Network Address Translation (STUN).

Turning to FIG. 5, a ladder diagram will now be described showing an example of the two network devices from FIG. 4 establishing an IPsec session using Enhanced XMPP Jingle process logic 300 with STUN. At 510, the initiator, network device 110, sends a STUN binding request to the STUN server 470. The message contains network device 110's private IP address and a port number, e.g., "port 4500" for receiving IPsec UDP packets. At 520, the STUN server 470 responds with the public IP address and port pair. The binding between public IP address and "port 4500", and private IP address and "port 4500" needs to be kept alive by regularly sending binding requests to a STUN server until it is determined that the NA(P)T binding is not needed because the target endpoint (session responder) is within the same IPv4 address space as described in connection with FIG. 1 or until end-to-end connectivity checks are initiated (described hereinafter). For most firewalls, the timeout for NA(P)T bindings is one minute. The recommended best practice is to send a STUN binding request every 30 seconds.

At 310 and 320, session keys are generated and the Enhanced XMPP Jingle process logic 300 Enhanced Jingle SESSION-INITIATE message is sent and acknowledged as described in connection with FIG. 3. At 530, the responder, network device 120, sends a STUN binding request to the STUN server 470. The message contains network device 120's private IP address and a port number, e.g., "port 4500" for receiving IPsec UDP packets. At 540, the STUN server 470 responds with the public IP address and port pair. At 550, the responder sends (1) a STUN binding request (per RFC 5389) to the initiator's private address and port provided in the Enhanced Jingle SESSION-INITIATE message (note that this is skipped if no private address was provided in the Enhanced Jingle SESSION-INITIATE message) and (2) a STUN binding request (per RFC 5389) to the initiator's public address and port provided in the Enhanced Jingle SESSION-INITIATE message.

The source address in a binding request that is launched through a NAT into the public internet gets translated into a public IP address. For a binding request that stays within the confines a private network, the source address remains the private IP address of the responder. In one example, the responder includes the following credentials in the STUN binding request: (1) The responder's JID as a USERNAME attribute, and (2) A MESSAGE-INTEGRITY attribute computed as a 20-byte HMAC-SHA1 hash (per RFC 2104) over portions of the STUN message, using the short-term credentials procedure of Section 15.4 of RFC 5389. The STUN password 'stunpwd' attribute conveyed in the Enhanced Jingle SESSION-INITIATE message by the session initiator is used as the key. Note that the resource name field in the responder's JID is optional.

The session initiator uses the STUN credentials in the binding request to verify that the request is from an entity to which it had issued a SESSION-INITIATE command. At 560, upon verification, the session initiator sends a STUN binding response to the source address and port in the binding request. If session initiator receives binding requests from multiple source addresses (public or private IP addresses), it sends binding responses to all.

If the session initiator and responder are not in the same private address space, then it is possible that an unrelated entity within the same private IP address space as the session responder will receive the STUN request. The unrelated entity cannot accidentally or maliciously send a valid STUN binding response at 560 since this response is credentialed on the basis of the STUN password, which is a shared secret password between the session initiator and responder.

The session responder may repeat the STUN binding request to the session initiator if it does not receive a STUN binding response within a period of time, e.g., 10 seconds. The request may be repeated for a predetermined number of times in the absence of a STUN response. The predetermined number exists so that a party that is not the session initiator is not disturbed unnecessarily. As explained above, the session initiator responds to all authenticated binding requests, whether these have public or private IP source addresses.

In its response, the initiator includes the following credentials in a valid STUN binding response: (1) The initiator's JID as the USERNAME attribute, and (2) A MESSAGE-INTEGRITY attribute computed as a 20-byte HMAC-SHA1 hash (RFC 2104) over portions of the STUN message, using the short-term credentials procedure of Section 15.4 of RFC 5389. The STUN password (stunpwd) attribute generated in Step 3 by the session initiator is used as the key. The initiator and the responder may use the same password for generating STUN credentials. Also note that the resource name field in the initiator's JID is optional.

The responder might receive authenticated binding responses with public and/or private source addresses from the initiator. Based on these responses the responder determines whether it is in the same private IP address space as the initiator or not. A response with a private source address indicates that it is in the same private IP address space. If the initiator is in the same private address space and also has external Internet connectivity, then binding responses with both public and private source addresses may be expected. If the initiator is not in the same private address space but has external Internet connectivity, then binding responses with public but not private source addresses may be expected. The absence of a response is ascertained on the basis of timeouts, e.g., the timeout interval may be 10 seconds and the binding request is repeated three times.

At 330, if the offer is accepted and STUN binding is complete, network device 120 sends an Enhanced Jingle SESSION-ACCEPT message as described in connection with FIG. 3. At 340, the Enhanced Jingle SESSION-ACCEPT message is acknowledged by network device 110. Network devices 110 and 120 can now participate in IPsec session shown at 150. At any time after STUN binding is complete, STUN keep-alives or heartbeats are sent in both directions to keep NA(P)T bindings alive at both ends and to ensure that the endpoints are still active.

Figure 6:
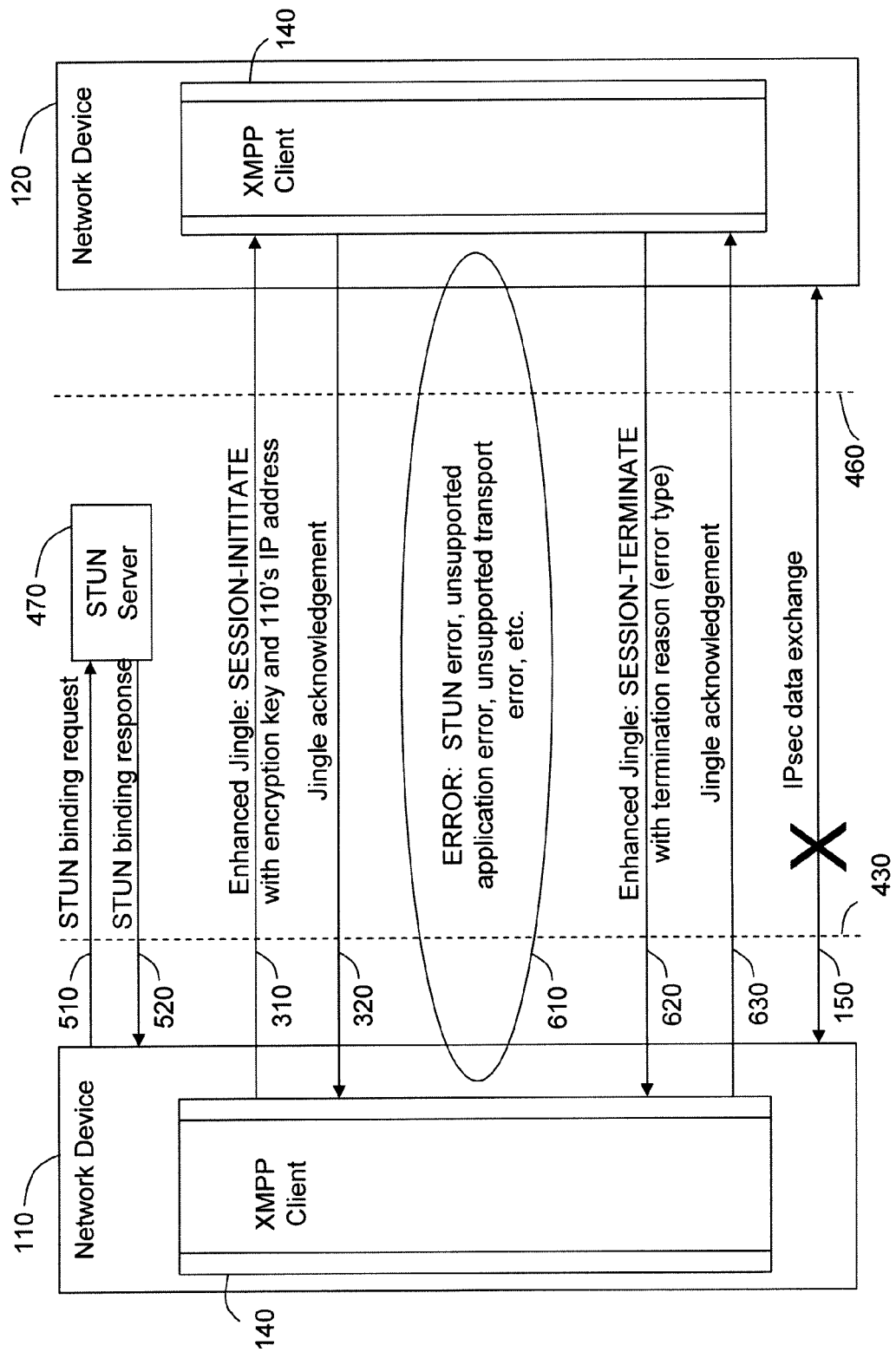
FIG. 6 is a ladder diagram showing an example of two network devices from FIG. 4 attempting to establish an IPsec session using Enhanced XMPP Jingle process logic and STUN when an error condition is present.

Referring to FIG. 6, a ladder diagram will be described showing an example of the two network devices from FIG. 4 attempting (but failing) to establish an IPsec session using Enhanced XMPP Jingle process logic 300 with STUN. Steps 510, 520, 310, and 320, occur as described in connection with FIGS. 5 and 3, respectively. However, at 610, an error occurs. The error could be, e.g., an unsupported application offered in the 'payloadfmt' element of the Enhanced Jingle SESSION-INITIATE message, a non-supported transport method, or lack of STUN binding response from the session initiator (a connectivity error). It should be noted that any number of errors may be signaled for rejecting a session offer, canceling a session during session set-up, formally terminating the IPsec session (e.g., a network device may be shutting down), or other error conditions per RFC 3920. At 620, an Enhanced Jingle SESSION-TERMINATE message is sent from network device 120 to network device 110. An example of an Enhanced Jingle SESSION-TERMINATE message for unsupported applications is shown in Listing 3 below.

Listing 3.

```
<iq from='device2@cluster1.cisco.com/out-of-band'
    id='term1'
    to='device1@cluster1.cisco.com/out-of-band'
    type='set'>
  <jingle xmlns='urn:xmpp:jingle:1'
          action='session-terminate'
          initiator='device1@cluster1.cisco.com/out-of-band'
          sid='a73sjjvkla37jfea'>
    <reason >
      <unsupported applications/>
    </reason>
  </jingle>
</iq>
```

In Listing 3, the 'to' and 'initiator' JIDs in this XML code segment are identical. The 'id' attribute is set to 'term1' for consistency with the examples in XEP-0166 and XEP-0167. There is no particular significance to this choice. The sole purpose of this attribute is to correlate <iq/> requests with responses. Any other string such as '789' or 'pqr' could have been used instead. At 630, the Enhanced Jingle SESSION-TERMINATE message is acknowledged with a normal Jingle acknowledgment. In this example, the IPsec session 150 cannot be established.

Referring to FIG. 7, a ladder diagram is described that shows an example of the two network devices from FIG. 1 or 4 establishing an IPsec session using Enhanced XMPP Jingle process logic in which the second network device initiates a callback request to the first network device. In some instances, connectivity clients at one endpoint may need to be lightweight, i.e., the connectivity clients at the one endpoint are not required to have the means for generating session keys and for accepting and processing STUN binding requests. If the connectivity clients at one endpoint do not support session key generation or the processing of STUN binding requests, then IPsec/UDP sessions must be initiated from the other endpoint. In this case a callback procedure may be initiated by the lightweight client. At 710, an Enhanced Jingle SESSION-INITIATE message with a callback request is sent from network device 120 to network device 110. An example Enhanced Jingle SESSION-INITIATE message with a callback request is shown in Listing 4 below.

Listing 4.

```
<iq from='device2@cluster1.cisco.com/out-of-band'
    id='jingle1'
    to='device1@cluster1.cisco.com/out-of-band'
    type='set'>
  <jingle xmlns='urn:xmpp:jingle:1'
          action='session-initiate'
          initiator='device2@cluster1.cisco.com/out-of-band'
          sid='RD1dLLbh6UiMYXvz'>
    <content creator='initiator' name='ipv4sec-udp-v1'>
      <callback-request
          xmlns='http://collaboratory.cisco.com/confluence/x/4oMKAQ'/>
    </content>
  </jingle>
</iq>
```

The <iq>, <jingle>, <content>, start tag and attributes conform to RFC-3920 and are the same as those described in connection with Listing 1. The difference between Listing 4 and Listing 1 is that a <call-back request> element replaces the <description> and <transport> elements shown in Listing 1.

At 720, the Enhanced Jingle SESSION-INITIATE message is acknowledged by network device 110 with an Enhanced Jingle 'callback' acknowledgement. On receiving a positive acknowledgement, the XMPP client at device 120 knows that the callback request has been received and that a callback will be initiated. If device 110 cannot honor the callback request, then it will return a negative acknowledgement. Other errors like those described in connection with FIG. 6 may also be grounds for a negative acknowledgement. At 730, an Enhanced Jingle SESSION-TERMINATE message is sent from network device 110 to network device 120 with a 'callback-invoked' reason. The SESSION-TERMINATE message is a formality to terminate the existing session since a new session will be initiated in response to the callback request. At 740, the Enhanced Jingle SESSION-TERMINATE message is acknowledged by network device 120 with a normal Jingle acknowledgment. Enhanced XMPP Jingle process logic 300 can begin and IPsec session 150 can be established. Since it is already established that a callback will be initiated, only the Enhanced Jingle SESSION-INITIATE message 310 and acknowledgment 320, as described in connection with FIG. 3, need be sent for IPsec session 150 to be established.

In sum, techniques are provided herein for sending from a client in a first network device a session initiate message over a first secure network connection that is configured to initiate a communications session with a client in a second network device. The session initiate message is configured to supply connection information for the second network device to establish a second secure network connection with the first network device. A session accept message is received from the client in the second network device over the first secure network connection that is configured to accept the communications session with the client in the first network device. The session accept message is configured to supply connection information for the first network device to establish the second secure network connection with the second network device. The second secure network connection is established between the first network device and the second network device using the connection information. The session initiate and session accept messages are sent and received as specialized message functions of the first secure network connection normally used for voice or other data, e.g., video.

The above description is intended by way of example only.

What is claimed is:

1. A method comprising:
    sending from a client in a first network device a session initiate message over a first encrypted network connection that is configured to initiate a communications session with a client in a second network device, wherein the session initiate message is configured to supply connection information for the second network device to establish a second encrypted network connection with the first network device, wherein the connection information comprises all of the following: one or more Internet Protocol (IP) addresses for the first network device, a payload format for the second encrypted network connection, an encryption type for the second encrypted network connection, an encryption key for the second secure network connection, a digital fingerprint and Jabber identification in order to obtain a device-specific certificate from a trusted signing authority;
    receiving from the client in the second network device a session accept message over the first encrypted network connection that is configured to accept the communications session with the client in the first network device, wherein the session accept message is configured to supply connection information for the first network device to establish the second encrypted network connection with the second network device; and
    establishing the second encrypted network connection between the first network device and the second network device using the connection information.

2. The method of claim 1, wherein the first secure network connection is a server-mediated Extensible Messaging and Presence Protocol (XMPP) session.

3. The method of claim 2, wherein sending and receiving are performed via the server-mediated XMPP session using a Transport Layer Security (TLS) mechanism.

4. The method of claim 1, wherein sending comprises sending the session initiate message as a specialized message function of the first secure network connection normally used for voice or other data.

5. The method of claim 4, wherein sending comprises sending the session initiate message as a modified Jingle extension of the Extensible Messaging and Presence Protocol (XMPP).

6. The method of claim 1, wherein receiving comprises receiving the session accept message as a modified Jingle extension of the Extensible Messaging and Presence Protocol (XMPP).

7. The method of claim 6, and further comprising at the second network device, generating the session accept message comprising one or more Internet Protocol (IP) addresses for the second network device, an encryption type for the second secure network connection, and an encryption key for the second secure network connection.

8. The method of claim 7, wherein generating the session accept message further comprises generating a digital fingerprint and Jabber identification in order to obtain a device-specific certificate from a trusted signing authority.

9. The method of claim 1, wherein the second secure network connection is an Internet Protocol Security (IPsec) connection.

10. An apparatus comprising:
    a memory;
    an interface unit configured to enable communication over a network; and
    a processor coupled to the memory and network interface unit, and configured to:
        send a session initiate message over a first encrypted network connection that is configured to initiate a communications session with a client in another network device, wherein the session initiate message is configured to supply connection information for the other network device to establish a second encrypted network connection and wherein the connection information comprises all of the following: one or more Internet Protocol (IP) addresses for the apparatus, a payload format for the second encrypted network connection, an encryption type for the second encrypted network connection, an encryption key for the second encrypted network connection, a digital fingerprint and Jabber identification in order to obtain a device-specific certificate from a trusted signing authority;
        receive from the client in the other network device a session accept message over the first encrypted network connection that is configured to accept the communications session, wherein the session accept message is configured to supply connection information in order to establish the second encrypted network connection with the other network device; and
        establish the second encrypted network connection with the other network device using the connection information.

11. The apparatus of claim 10, wherein the processor is configured to send the session initiate message over the first secure network connection as a server-mediated Extensible Messaging and Presence Protocol (XMPP) session.

12. The apparatus of claim 11, wherein the processor is configured to send and receive communications over the server-mediated XMPP session using a Transport Layer Security (TLS) mechanism.

13. The apparatus of claim 10, wherein the processor is configured to send the session initiate message as a specialized message function of the first secure network connection normally used for voice or other data.

14. The apparatus of claim 13, wherein the processor is configured to send the session initiate message as a modified Jingle extension of the Extensible Messaging and Presence Protocol (XMPP).

15. A system comprising the apparatus of claim 10, and comprising the other network device, wherein the other network device is configured to generate the session accept message comprising one or more Internet Protocol (IP) addresses for the other network device, an encryption type for the second secure network connection, and an encryption key for the second secure network connection.

16. A non-transitory processor readable medium storing instructions that, when executed by a processor, cause the processor to:

send a session initiate message from a first network device over a first encrypted network connection that is configured to initiate a communications session with a second network device, wherein the session initiate message is configured to supply connection information for the second network device to establish a second encrypted network connection with the first network device, wherein the connection information comprises all of the following: one or more Internet Protocol (IP) addresses for the first network device, a payload format for the second encrypted network connection, an encryption type for the second encrypted network connection, an encryption key for the second encrypted network connection, a digital fingerprint and Jabber identification in order to obtain a device-specific certificate from a trusted signing authority;

receive from the second network device a session accept message over the first encrypted network connection that is configured to accept the communications session with the first network device, wherein the session accept message is configured to supply connection information for the first network device to establish the second encrypted network connection with the second network device; and establish the second encrypted network connection between the first network device and the second network device using the connection information.

17. The processor readable medium of claim 16, wherein the instructions that send comprise instructions to send the session initiate message as a modified Jingle extension of the Extensible Messaging and Presence Protocol (XMPP).

18. The processor readable medium of claim 16, wherein the instructions that receive comprise instructions to receive the session accept message as a modified Jingle extension of the Extensible Messaging and Presence Protocol (XMPP).

* * * * *